Nov. 20, 1934.  O. DOWE  1,981,165
AUTOMOBILE JACK
Filed Aug. 8, 1934   4 Sheets-Sheet 1
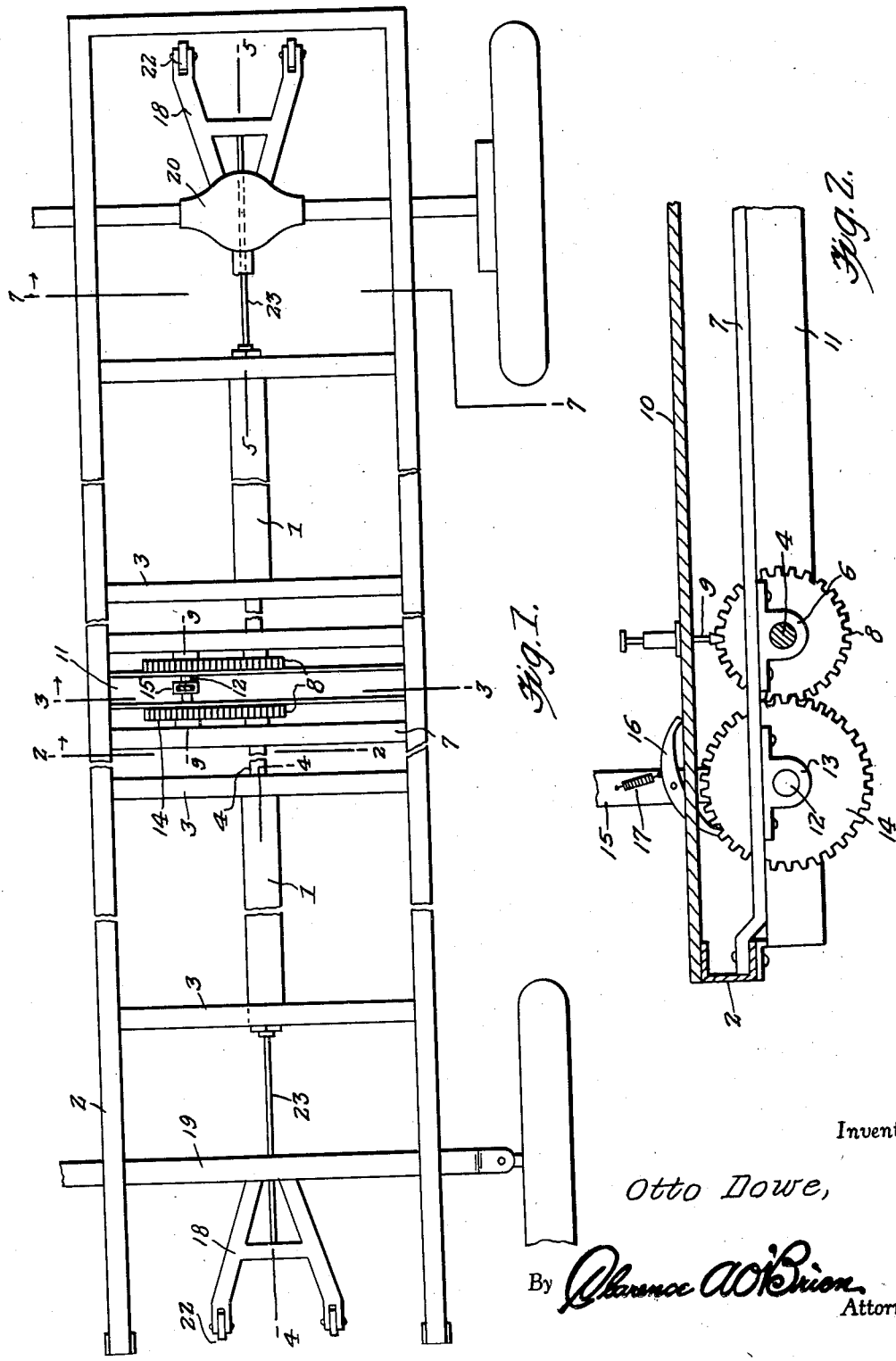
Inventor
*Otto Dowe,*
By *Clarence A. O'Brien*
Attorney

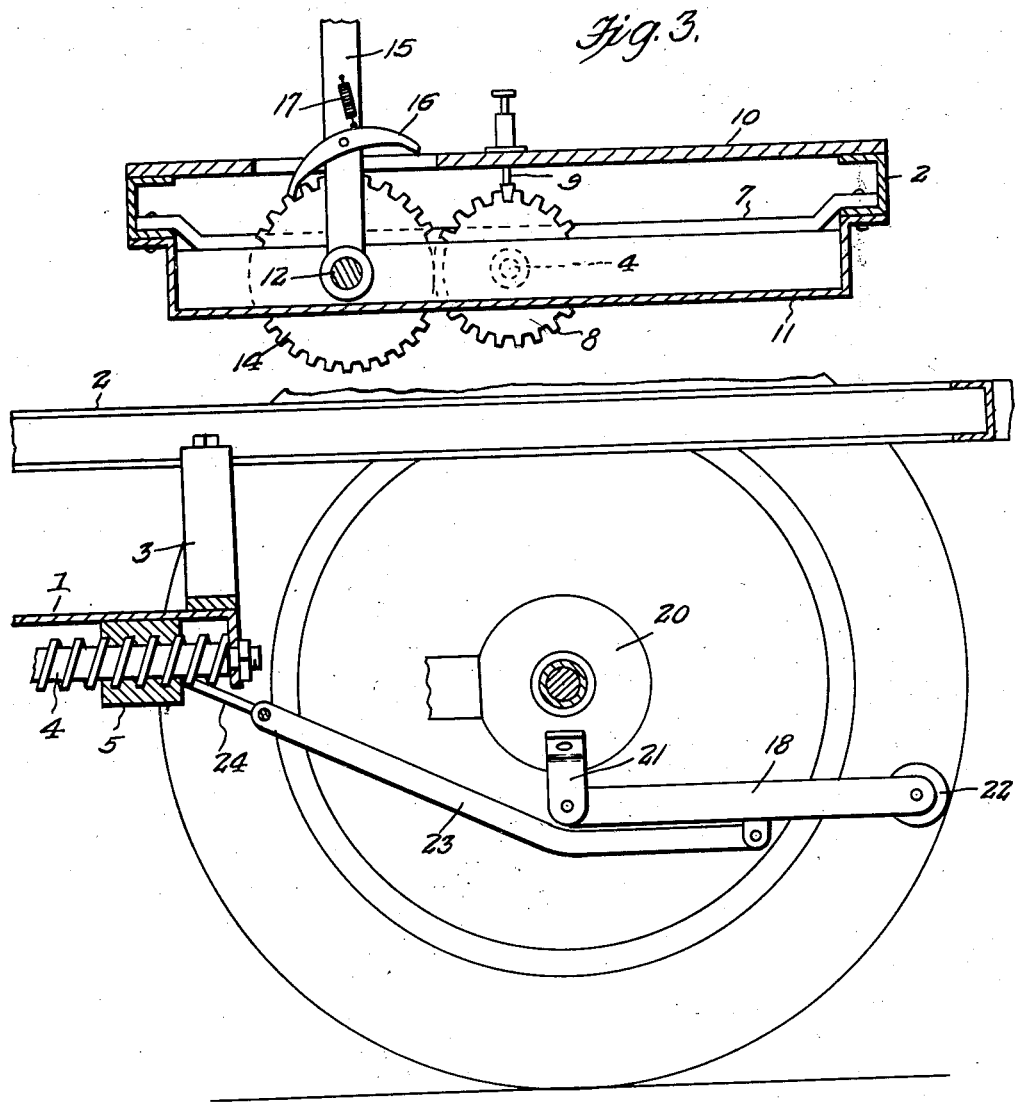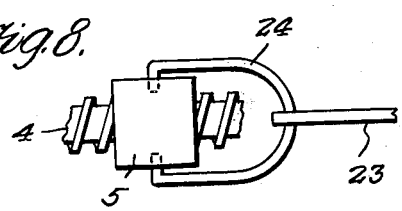

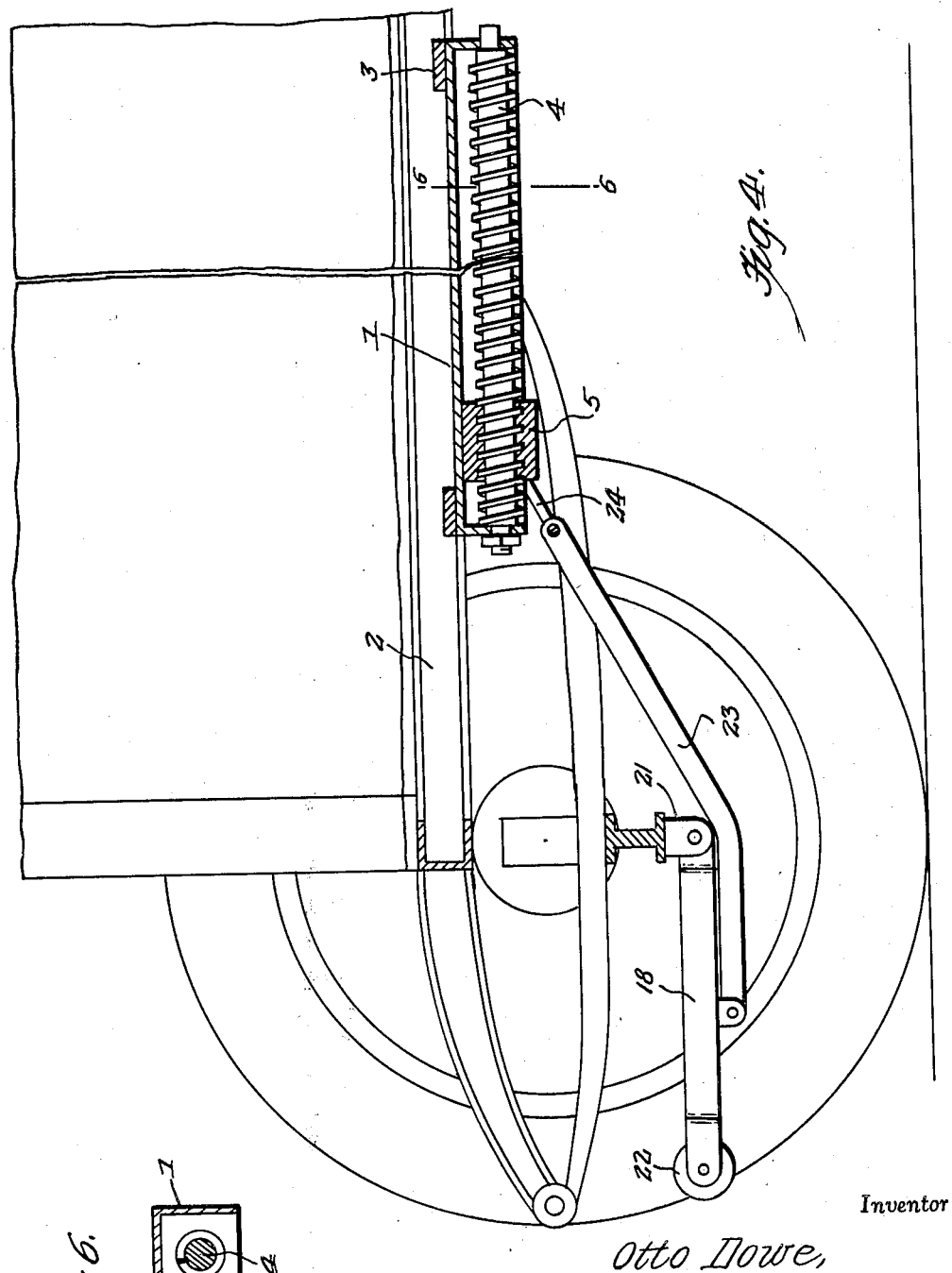

Nov. 20, 1934.  O. DOWE  1,981,165
AUTOMOBILE JACK
Filed Aug. 8, 1934  4 Sheets-Sheet 4
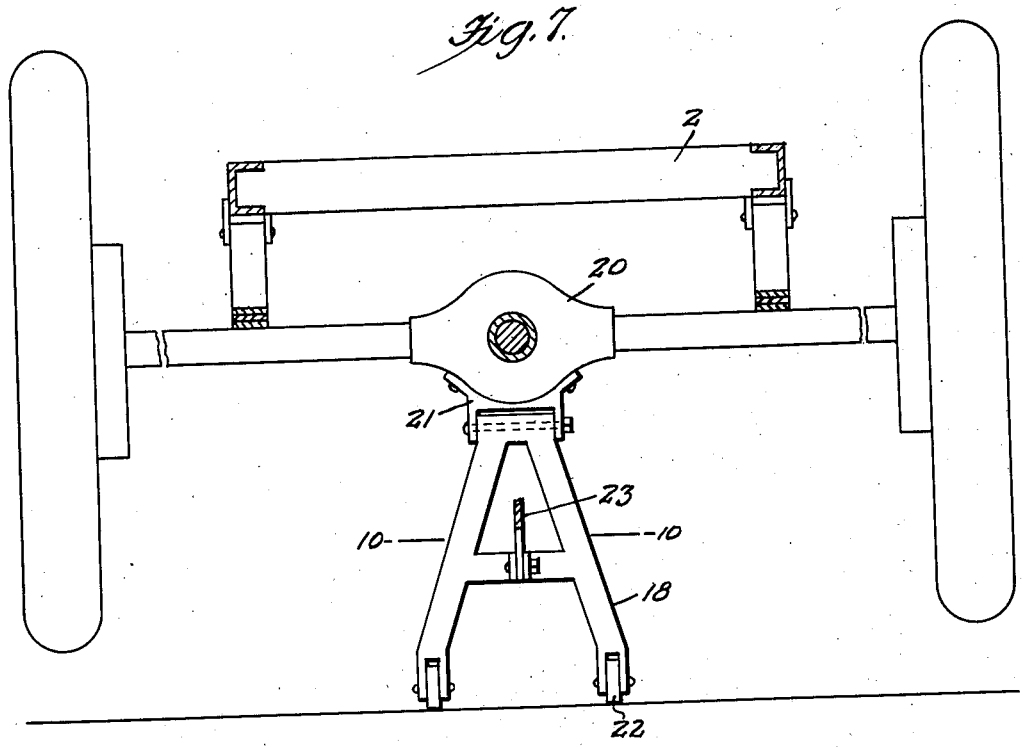
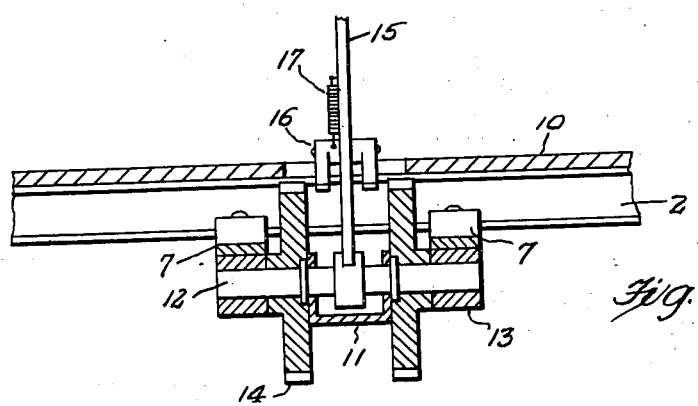
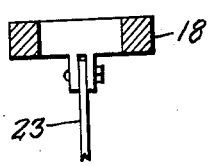
Inventor
Otto Dowe,
By Clarence A. O'Brien
Attorney Patented Nov. 20, 1934

1,981,165

UNITED STATES PATENT OFFICE 1,981,165

AUTOMOBILE JACK

Otto Dowe, Chicago, Ill.

Application August 8, 1934, Serial No. 739,019

3 Claims. (Cl. 254—86)

The present invention relates to new and useful improvements in automobile jacks and has for its primary object to provide, in a manner as hereinafter set forth, a jack of this character which embodies a novel construction, combination and arrangement of parts through the medium of which either the front or rear end of the automobile, or both, may be expeditiously raised from within the automobile with a minimum of effort.

Another important object of the invention is to provide a jack of the aforementioned character which is permanently installed on the automobile ready for operation at all times but which, when in inoperative position, will interfere in no way with the operation of said automobile.

Still another important object of the invention is to provide a jack of the character described comprising a novel operating mechanism through the medium of which a single lever serves to raise and lower either the front or rear end of the automobile.

Other objects of the invention are to provide an automobile jack of the character set forth which will be comparatively simple in construction, strong, durable, highly efficient and reliable in operation, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view top plan of a jack constructed in accordance with the present invention, showing the same installed on the chassis of an automobile.

Figure 2 is a view in transverse section, taken substantially on the line 2—2 of Figure 1.

Figure 3 is a view in transverse section, taken substantially on the line 3—3 of Figure 1.

Figure 4 is a view in vertical longitudinal section, taken substantially on the line 4—4 of Figure 1.

Figure 5 is a vertical longitudinal sectional view, taken substantially on the line 5—5 of Figure 1.

Figure 6 is a vertical transverse sectional view, taken substantially on the line 6—6 of Figure 4.

Figure 7 is a view in vertical transverse section, taken substantially on the line 7—7 of Figure 1.

Figure 8 is a detail view in plan, showing the means for connecting the jack operating bars to the screw actuated nuts.

Figure 9 is a view in vertical longitudinal section, taken substantially on the line 9—9 of Figure 1.

Figure 10 is a detail view in horizontal section through one of the jack members, taken substantially on the line 10—10 of Figure 7.

Referring now to the drawings in detail, it will be seen that the embodiment of the invention which has been illustrated comprises a pair of casings 1 which are supported longitudinally on the frame 2 of the automobile through the medium of cross members 3. Journaled in the casings 1 are screw shafts 4 upon which blocks or nuts 5 are threadedly mounted. It will thus be seen that the blocks or nuts 5 are adapted to travel longitudinally in the casings 1.

The adjacent end portions of the screw shafts 4 are journaled in bearings 6 which are mounted beneath cross members 7 and fixed on said adjacent end portions of the screw shafts are gears 8 which are adapted to be locked against rotation through the medium of suitable bolts 9 which are operable through the floor 10 of the automobile.

Journaled in a substantially channel-shaped cross member 11 is a comparatively short longitudinally extending shaft 12 (see Figure 9), the end portions of which are journaled in bearings 13 which are mounted beneath the cross members 7. Fixed on the shaft 12 between the bearings 13 and the channel member 11 are comparatively large drive gears 14 which are in mesh with the gears 8. The reference numeral 15 designates an operating lever which is rotatably and slidably mounted on the shaft 12 in the channel member 11. Reversible pawls 16 are pivotally mounted on the lever 15 for operatively connecting said lever to either of the gears 14, a spring 17 being provided for yieldingly urging said pawls in one direction.

Substantially A-shaped jacks 18 are pivotally mounted beneath the front axle 19 and the differential housing 20 of the automobile through the medium of brackets 21. The legs of the jacks 18 have journaled thereon ground engaging rollers or wheels 22. The reference numeral 23 designates bars which are pivotally connected, at one end, to intermediate portions of the jacks 18. The other ends of the bars 23 are connected to the screw actuated blocks or nuts 5 by yokes 24.

It is thought that the operation of the invention will be obvious from a consideration of the foregoing. When it is desired to raise the front end of the automobile, the lever 15 is slid forwardly on the shaft 12 to engage the forwardmost pawl 16 with the adjacent gear 14 for operatively connecting said lever 15 with the forwardmost screw shaft 4. Then, the lever 15 is actuated to rotate the forwardmost screw shaft 4 in a direction to move the respective nut 5 rearwardly, thus swinging the forwardmost jack 18 downwardly into engagement with the ground for elevating the front end of the automobile. To lower the front end of the automobile the engaged pawl 16 is reversed to actuate the forwardmost screw shaft 4 in the opposite direction, thus moving the respective nut 5 forwardly for elevating the forwardmost jack 18 to inoperative position, as seen in Figure 4 of the drawings. To elevate the rear end of the automobile, the lever 15 is slid rearwardly on the shaft 12 to operatively engage the rearmost gear 14 through the medium of the other pawl 16 and the aforementioned operation is repeated. Figure 7 of the drawings shows the rear jack 18 in operative position with the rear wheels of the automobile elevated. The bolts 9 releasably secure the screw shafts 4 against rotation.

It is believed that the many advantages of an automobile jack constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. An automobile lifting mechanism of the class described comprising a pair of screw shafts journaled longitudinally on the automobile, jacks pivotally mounted on the front and rear axles of the automobile, nuts threadedly mounted on the screw shafts, bars operatively connecting the jacks to the nuts for actuation thereby, gears fixed on the screw shafts, another shaft mounted on the automobile, gears mounted on the second named shaft and engaged with the first named gears, a lever rotatably and slidably mounted on the second named shaft between the second-named gears, and pawls mounted on the lever and engageable with the second-named gears for selectively connecting the lever to said second-named gears.

2. An automobile lifting mechanism of the class described comprising a channel member mounted on the frame of the automobile, a shaft extending through the channel member, gears journaled on the shaft, screw shafts rotatably mounted on the frame of the automobile, gears on the screw shafts engaged with the first-named gears, jacks pivotally mounted beneath the front and rear axles of the automobile, means operatively connecting the jacks to the screw shafts for actuation thereby, a lever rotatably and slidably mounted on the first-named shaft within the channel member, and pawls pivotally mounted on the lever and engageable with the first-named gears for selectively connecting said lever thereto.

3. An automobile lifting mechanism of the class described comprising casings mounted on the frame of the automobile, longitudinally aligned screw shafts journaled in the casings, nuts threadedly mounted on the screw shafts and operable in the casings, substantially A-shaped jacks pivotally mounted beneath the front and rear axles of the automobile, means operatively connecting the jacks to the nuts for actuation thereby, a channel member mounted transversely on the frame of the automobile, a shaft extending through said channel member, gears mounted on the second-named shaft and operatively connected to the screw shafts, a lever rotatably and slidably mounted on the second-named shaft in the channel member, and pawls pivotally mounted on the lever and engageable with the gears for selectively connecting said lever thereto.

OTTO DOWE.